Figure 1:
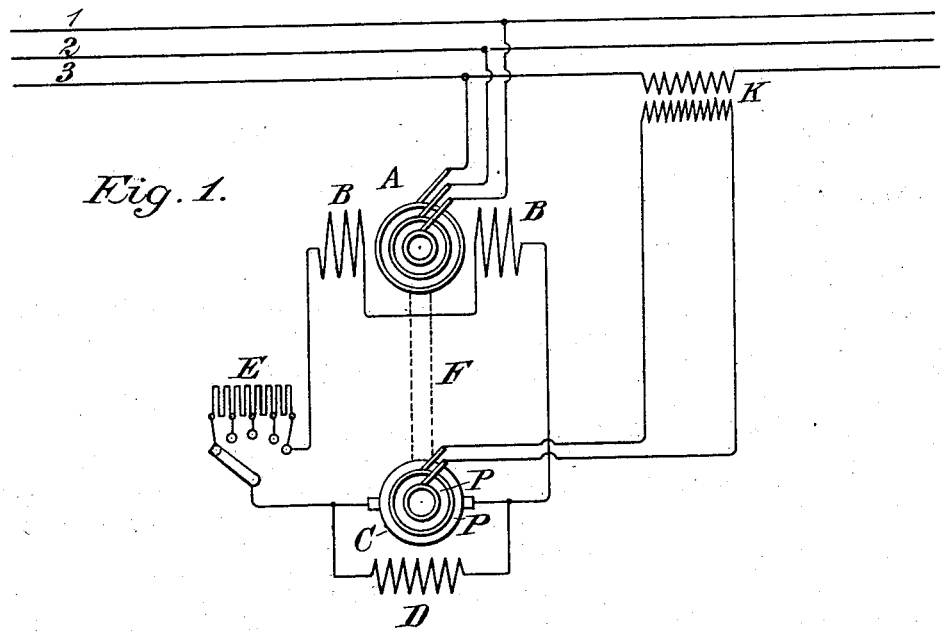

No. 726,935. PATENTED MAY 5, 1903.
T. J. JOHNSTON.
REGULATION OF ALTERNATING CIRCUITS.
APPLICATION FILED NOV. 20, 1901.
NO MODEL.

No. 726,935. Patented May 5, 1903.

UNITED STATES PATENT OFFICE.

THOMAS J. JOHNSTON, OF BROOKLYN, NEW YORK, ASSIGNOR TO GENERAL ELECTRIC COMPANY, A CORPORATION OF NEW YORK.

REGULATION OF ALTERNATING CIRCUITS.

SPECIFICATION forming part of Letters Patent No. 726,935, dated May 5, 1903.

Application filed November 20, 1901. Serial No. 82,995. (No model.)

*To all whom it may concern:*

Be it known that I, THOMAS J. JOHNSTON, of Brooklyn, in the county of Kings and State of New York, have made certain new and useful Improvements in the Regulation of Alternating Circuits, of which the following is a specification.

My present invention relates to the regulation of alternating circuits, and has for its object to provide a convenient and efficient method of maintaining the power factor as near to unity as is commercially practicable.

It is well known that the efficiency of altering-current transmission diminishes when current and electromotive force in the circuit are out of phase. In operation the extent to which this dephasing occurs is dependent upon the electric characteristics of the circuit in which the alternating current flows, an increase of inductance causing the current to lag and of capacity causing it to lead the electromotive force. It has been heretofore proposed to furnish to the circuit having a leading or lagging current a reactance of opposite characteristic, so as to correct the tendency to dephasing already referred to. The most convenient way to accomplish this is by the regulation of the field of a synchronous motor. This apparatus has the characterstic of furnishing leading current when the field is strengthened above and lagging current when the strength of the field falls below what may be called its "critical" value. It is in general to this form of regulation that my present invention is addressed; and it consists in separately exciting the field of a synchronous motor and furnishing to the armature of the exciter, either by direct or inductive connection, (preferably the latter,) a current varying in value and phase with that flowing in the main alternating circuit. The effect of this is to alter the armature reaction of the exciter in such a way as to vary the field magnetization of the motor to the desired extent and in the desired direction, as will be more fully pointed out hereinafter.

Under some conditions the invention may be applied to an alternating-current rotary converter, either acting alone or running in multiple with others in a substation. Where the regulation of the system is the principal object, it is better to employ the synchronous motor, since under some conditions if the field of the converter is lowered too much the continuous current from the other machines may tend to reverse its direction and drive the regulating-converter. I aim to include the use of the converter within the scope of the claims; but, as above indicated, I regard the synchronous motor as the best adapted to the practice of the invention.

Whichever form of machine may be used should have considerable iron in its field-magnets, so that they may not become saturated and may respond readily and with comparative proportionality to changes in the exciting-current.

The exciter may be of any ordinary form. It is necessary, however, that it should be operated in strict synchronism with the motor or converter. While it is possible where the exciter has a different number of poles from the motor to accomplish this by a suitable gearing or by operating it by a separate synchronous motor, it is in general better, as will be apparent, to fix the armature of the exciter upon the motor-shaft and have the same number of poles in the field-magnets of the two machines. Where the device is used merely as a regulator, which may often be found desirable, it may be of comparatively small size and of few poles, since mechanical difficulties under such circumstances would not prevent a high speed of rotation.

The polar points of the exciter-armature should be so disposed that the maximum magnetization due to the wave of the main alternating current will be of opposite sign to the magnetization of the field-poles and somewhat ahead of that due to the rotation of the armature across the poles. Under this condition if the current in the main circuit leads the electromotive force the resultant magnetization due to the alternating current and the exciter-field will be cut down, and the current in the field of the synchronous motor will diminish, lowering its magnetization. The synchronous motor thus becomes underexcited and furnishes an inductive reactance to the system which neutralizes the leading current. On the other hand, if the current lags the resultant magnetization of the exciter-armature is such, inasmuch as the magnetic maxima due to the alternating current and to the exciter-field come more in line, as to increase the potential and current of the exciter, thus raising the effective field magnetization of the motor and furnishing a capacity reactance which neutralizes the lagging current.

Of course the apparatus may have the ordinary regulating-resistances in the field-circuit of the motor and also in that of the exciter, though I have not illustrated the latter, as its operation is well understood.

Figure 2:
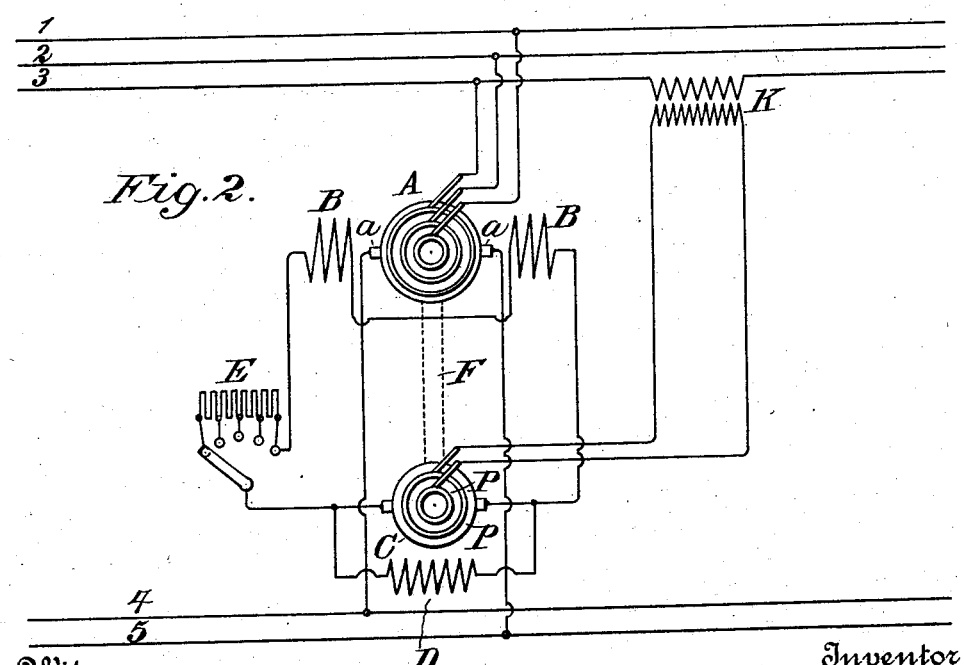

In the accompanying drawings, Figures 1 and 2 show in diagram the application of the invention to a synchronous motor and to a converter, the principles upon which it depends being the same in both cases.

In Fig. 1, 1, 2, and 3 are the mains of a three-phase alternating-current system which may be taken as typical of those of a system of any desired phase relation. A is the armature of the synchronous motor, of which B B are the fields. E is the regulating-resistance. C is the armature of the exciter, of which D is the field. At F is shown a belt which of course is typical of any rigid connection between the two armatures. P P are collector-rings tapped into the armature-winding of the exciter at points suitably selected according to the principles already outlined. To these collector-rings is furnished from a series transformer K a current varying in character with that in the main circuit. In the case illustrated the most convenient way of obtaining the displacement of phase requisite for the operation of the invention is to mechanically displace the armature of the exciter upon the shaft with reference to that of the motor.

In Fig. 2 the same reference-letters designate the same parts. A is here the armature of a synchronous converter supplying from the brushes $a$ $a$ continuous current to the mains 4 5. There will be no difference in principle in the operation of the invention whether the converter be run singly or in multiple with others; but, as already pointed out, the application of the invention is more limited where several converters are used, because where the inductive reactance is made too high the converter would tend to be driven as a continuous-current motor.

The principles upon which the invention may be operated differ from the novel and beautiful invention described in Patent to E. W. Rice, Jr., No. 595,412, dated December 14, 1897, although the combination of the apparatus is much the same as that therein described, because the invention described in that patent is designed to regulate the alternating-current system by raising and lowering the potential of the generator as a means of regulation, thus changing its output and compensating for the inductance drop as well as for that due to resistance by change in the terminal voltage of the generator. My invention, on the other hand, compensates for the inductive reactance of the system by furnishing a balancing capacity reactance, and vice versa, substantially limiting the dephasing characteristics of the circuit. The regulation of the generator in a system provided with my invention may thus be governed by the current-flow regardless of the power factor and be proportioned strictly to the increase or decrease of the resistance drop due to change in the current-flow, or at least approximately so, within commercial limits. Where an inductive connection, such as that through the transformer K, is employed, regard must be had to the difference of phase between the primary and secondary currents in selecting the desired angle of displacement of the two armatures.

Regulators varying the field of the synchronous motor by change of the resistance usually connected in series operate according to the subdivision of the regulating-resistance into steps of greater or less amount. The changes of the motor-field are by my invention almost mathematically incremental, and except for the slight dash-pot effect of hysteresis (which is often desirable, inasmuch as it obviates immediate proportionate response to momentary excessive fluctuations) nearly instantaneous. The desired regulation is thus more nearly accomplished, lessening the fluctuations incident to the starting and stopping of machinery, the variations of motor speed, and so far as it is dependent upon the characteristics of the circuit the "hunting" of synchronous converters and motors.

Having thus described my invention, what I claim, and desire to protect by Letters Patent of the United States, is—

1. The combination of a synchronous motor and an exciter-dynamo the armatures of which rotate in synchronism, an electrical connection between the armatures by which the alternating current passes through the exciter-armature, the polar points of the exciter-armature being displaced from those of the motor; whereby when the current leads, the motor furnishes a compensating inductive reactance, and when current lags a capacity reactance, tending to correct the dephasing characteristics of the circuit and maintain the power factor approximately at unity.

2. In an alternating-current system, the combination of a synchronous motor, an exciter, and a connection between the armatures of the two machines by which alternating current is supplied to the exciter-armature at points in its winding so selected that the magnetization caused thereby shall be somewhat in advance of that due to the field-magnets of the exciter; whereby when the alternating current leads, the exciter-field is weakened, and when the current lags, the field is strengthened.

3. In an alternating-current system, the combination of a synchronous motor, with means for raising or lowering its field magnetization as current lags behind or leads the electromotive force in the circuit; such means consisting of an exciter-dynamo having its armature fixed to the shaft of the motor with its polar points displaced from those of the motor-armature, and an electric connection between the windings of the two armatures.

4. In an alternating-current system, means for regulating the phase relation of current and electromotive force, consisting of a synchronous machine, such as a motor or converter, provided with a single regulating-winding, an exciter-dynamo furnishing the current for said winding, and means dependent upon the phase relation for varying said current.

In witness whereof I have hereunto set my hand, this 12th day of November, 1901, in the presence of two witnesses.

THOMAS J. JOHNSTON.

Witnesses:
ERMINA E. WALKER,
DANL. J. MCNAMARA, Jr.